United States Patent [19]

Konno

[11] Patent Number: 4,626,092
[45] Date of Patent: Dec. 2, 1986

[54] CLUTCH MECHANISM FOR CAMERA

[75] Inventor: Tatsuo Konno, Kanagawa, Japan

[73] Assignee: Canon Kabushiki Kaisha, Tokyo, Japan

[21] Appl. No.: 633,805

[22] Filed: Jul. 24, 1984

[30] Foreign Application Priority Data

Jul. 30, 1983 [JP] Japan .................................. 58-140230

[51] Int. Cl.[4] .............................................. G03B 1/40
[52] U.S. Cl. .................................................. 354/212
[58] Field of Search .............................. 354/212-214; 192/108, 114 T, 67 R

[56] References Cited

U.S. PATENT DOCUMENTS

| 1,672,582 | 6/1928 | Tenney | 192/67 R |
|---|---|---|---|
| 2,437,207 | 3/1948 | Noxon | 192/67 R |
| 2,787,355 | 4/1957 | Dodge | 192/108 X |
| 3,204,731 | 9/1965 | Bent et al. | 192/108 X |
| 3,249,188 | 5/1966 | Maina | 192/108 |
| 3,986,409 | 10/1976 | Tripp et al. | 192/108 X |
| 4,145,011 | 3/1979 | Date | 354/214 X |

Primary Examiner—William B. Perkey
Attorney, Agent, or Firm—Toren, McGeady, Stanger, Goldberg & Kiel

[57] ABSTRACT

A clutch mechanism for a camera having a winding and rewinding mechanism is arranged to be connected by a film winding operation and to disconnect a film take-up spool from a transmission system in the event of a film rewinding operation. The clutch mechanism is of a face type clutch arrangement having a different number of driving teeth from that of teeth to be driven.

8 Claims, 11 Drawing Figures

CLUTCH MECHANISM FOR CAMERA

BACKGROUND OF THE INVENTION

1. Field of the Invention:

This invention relates to a clutch mechanism for a camera having a winding and rewinding mechanism and more particularly to a clutch mechanism arranged to allow or to intermit transmission of a driving force between a film take-up spool and a take-up spool driving member.

Figure 2:
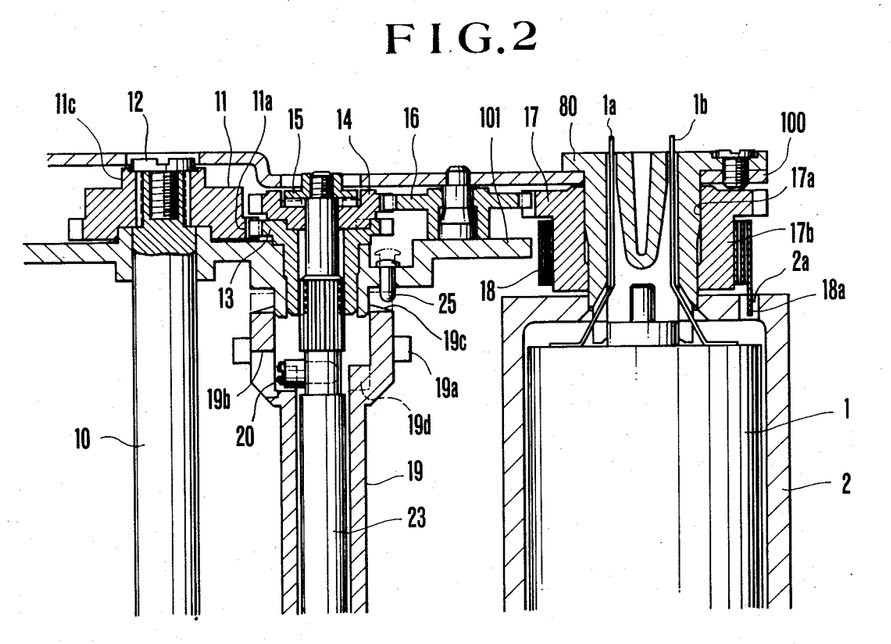
FIG. 2 is a longitudinal sectional view showing the essential parts of the motor driven winding and rewinding mechanism of FIG. 1.

2. Description of the Prior Art:

Generally, in a camera of the kind having a sprocket arranged to feed one frame portion of film at a time by turning a predetermined degree in response to each film winding operation and a spool arranged to take up the portion of film thus payed out, the moving extent of an arbitrary point on the periphery of the spool in the turning direction thereof is arranged to be greater than that of an arbitrary point on the periphery of the sprocket in order that the coil of film on the spool is tightened without fail. Assuming that the moving degree of the arbitrary point on the periphery of the sprocket is 1, the moving degree of the point of the periphery of the spool hereinafter will be called a peripheral speed ratio. The tight winding effect on the spool increases with this peripheral speed ratio. In taking up the film on the spool, the peripheral speed ratio comes to increase and thus incessantly varies as the radius of rotation is gradually increased by the increasing thickness of the coil of film taken up on the spool. This necessitates some mechanism that is capable of constantly absorbing the peripheral speed ratio. For this purpose, a known spool friction mechanism is arranged, for example, in a manner as shown in FIG. 2 of the accompanying drawings. In this mechanism, a take-up spool 2 and a spool gear 17 are coupled by means of an embracing spring 18 with the spool gear 17 and the spring 18 arranged to be caused to slip on each other by a torque greater than a predetermined value. The peripheral speed ratio in the initial stage of a film winding process is determined by the number of teeth of the spool gear 17. Assuming that the peripheral speed ratio at a certain point of time during the film winding process is 1.5, a difference in the moving extent is arranged to be absorbed by slipping to an extent corresponding to the difference of 0.5.

However, the above-stated spool friction mechanism and the peripheral speed ratio are important factors relative to problems arising in the automation of film winding, film rewinding and film loading operations as described below:

(i) As mentioned in the foregoing, the greater the value of the peripheral speed ratio, the faster the film coil tightening process. This bears an important meaning for automatic film loading (hereinafter called AL). Before the film is automatically set at a frame number 1, a film portion approximately corresponding to four frames is idly fed in general. Then, to prevent pictures taken on actually photographed frames from being damaged by friction between the film and the wall of a spool chamber, the coil of film taken up must be completely tightened on the spool during the blank feeding. Therefore, faster film coil tightening on the spool is advantageous. It is thus desirous to have a greater peripheral speed ratio. However, this requirement contradicts the following factors:

(ii) Although the peripheral speed ratio is absorbed by the slip, the friction torque produced by the slip eventually comes to impose a load on film winding toward the end of the film winding process. The load on film winding increases with the set value of the friction torque and the extent of the slip. The slipping extent is determined by the peripheral speed ratio. The former increases accordingly as the latter increases. Therefore, in respect to the winding load, it is preferable to have a smaller peripheral speed ratio value contrary to the requirement mentioned in paragraph (i) above.

(iii) In a general camera mechanism, the spool friction becomes a load at the time of film rewinding. In the event of a film rewinding operation arranged to be carried out either manually or by means of a large output of a motor drive, etc., a load such as the load imposed by the spool friction is almost negligible for the rewinding force available and the rewinding operation usually can be carried out through the friction. However in cases where rewinding is to be automatically accomplished with a small motor disposed within the camera body, the spool friction comes to present a load which is not negligible for the available driving force. Therefore, this calls for reduction in load not only for film winding but also for film rewinding.

Of these three problems mentioned in paragraphs (i)-(iii) above, there has been proposed a method for solving the problem of paragraph (iii) by providing a clutch between the spool gear shown in FIG. 2 and a driving member arranged to drive the spool gear. This method is disclosed, for example, by U.S. Pat. No. 4,373,795. The clutch is arranged to cut off transmission or connection to permit the spool to be freely turnable for film rewinding so that the problem of Paragraph (iii) can be solved.

Meanwhile, other problems that are relative to the peripheral speed ratio as mentioned in paragraphs (i) and (ii) still remain unsolved by the provision of the above-stated clutch. In the case of the above-stated clutch arrangement, a rotation loss almost always arises in the turning direction at the time of change-over from a disconnected state to a connected state. With respect to the sprocket and the spool, the spool does not come to turn until the clutch is completely connected while the sprocket is rotating. The peripheral speed ratio thus decreases in a degree corresponding to the extent of this delay. As to the winding load, the problem of arranging the peripheral speed ratio to be small in consideration of the winding load and to be large for AL as mentioned in Paragraphs (i) and (ii), the loss of the peripheral speed ratio arising at the time of the above-stated engaging operation of the clutch presents a serious problem.

To minimize the loss of the peripheral speed ratio with a face type clutch employed, a good result of course can be obtained by reducing the pitch of the upper and lower teeth constituting the clutch. For example, if the pitch of the upper and lower teeth is arranged to be 60°, the maximum angle of causing the loss of the peripheral speed ratio is 60° and is thus equal to the pitch. Therefore, in terms of the loss of the peripheral speed ratio, it is advantageous to make the pitch finer. However, if the pitch is excessively fine, each tooth not only comes to have a narrow width and less strength but also requires a complex machining process thus presenting another problem.

SUMMARY OF THE INVENTION

It is a first object of this invention to provide a clutch mechanism for a camera which is capable of reducing a rotation loss arising at the time of a shift from a disconnected state to a connected state without lowering the strength of a face type clutch used for the camera.

It is a second object of this invention to provide a clutch mechanism for a camera which is capable of reducing the loss of the peripheral speed ratio of a take-up spool which is arranged to take up loaded film.

These and further objects and features of the invention will become apparent from the following detailed description of a preferred embodiment thereof taken in connection with the accompanying drawings.

BRIEF DESCRIPTION OF THE DRAWINGS

The preferred embodiment of the invention is arranged as shown in the accompanying drawings, wherein.

DETAILED DESCRIPTION OF THE PREFERRED EMBODIMENT

Figure 1:
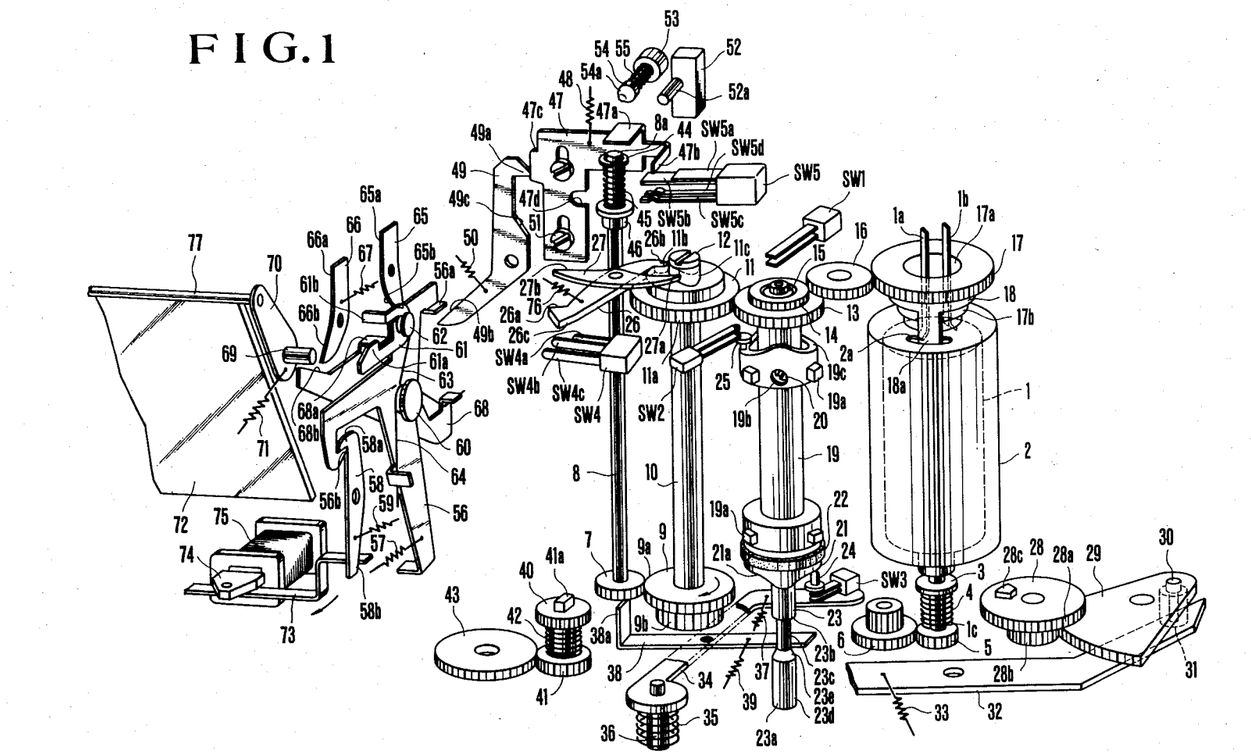
FIG. 1 is an exploded oblique view showing a motor-driven winding and rewinding mechanism of a camera to which the clutch mechanism of this invention is applied.

Referring to the accompanying drawings which show a preferred embodiment of the invention, a motor 1 is arranged to serve as a driving power source for all the charging operations of a camera such as charging for film winding, shutter charging, etc. The motor 1 is provided with power supply terminals 1a and 1b and is secured to a base plate (not shown). A film take-up spool 2 is arranged to have the above-stated motor 1 disposed within the spool and is rotatably carried by a base plate (not shown). The spool 2 is provided with a hole 2a which is arranged to engage the leg part 18a of an embracing (or spool friction) spring 18. A gear 5 is fitted on the rotating shaft 1c of the motor 1. A slip mechanism which consists of a coil or helical spring 4 and a clamp 3 is arranged to normally transmit the rotation torque of the motor 1 to the gear 5 as it is. A gear 6 is disposed at the first stage of a reduction gear train which is arranged to transmit the rotation of the gear 5 to a winding gear 9 with the gear 6 engaged with the gear 5. A gear 7 is disposed at the last stage of the reduction gear train and is arranged to engage the large gear part 9a of the winding gear 9. The gear 7 has a shaft 8 secured thereto and is arranged to be disengaged from the large gear part 9a and to be engaged with an absorbing gear 40 by a film rewinding operation which will be described later. The winding gear 9 consists of the large gear part 9a and a small gear part 9b which is arranged to engage the large gear part 28a of a gear 28. The winding gear 9 is secured to a winding shaft 10. A winding stop gear 11 consists of a gear part 11a which engages a gear 13, a notch part 11b which engages one end 26b of a winding stop lever 26 and a cam part 11c which is arranged to have one end of a mirror release lever 27 come to abut thereon. The gear 11 is secured to the widing shaft 10 by means of a screw 12.

Figure 5A:
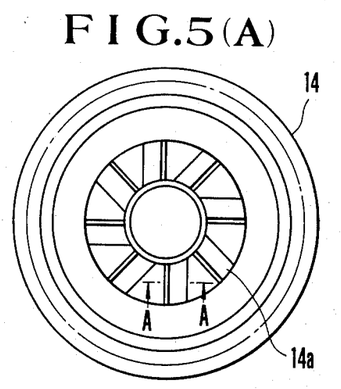
FIGS. 5(A) and 5(B) are plan and bottom views of members forming the clutch mechanism according to the invention.
Figure 5B:
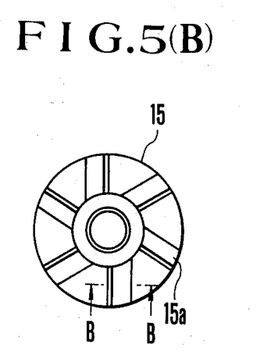
Figure 5C:
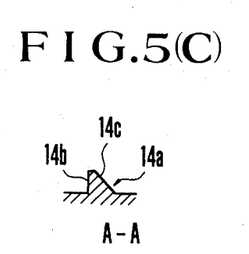
FIGS. 5(C) and 5(D) are sectional views showing the toothed parts of the clutch mechanism shown in FIGS. 5(A) and 5(B).
Figure 5D:
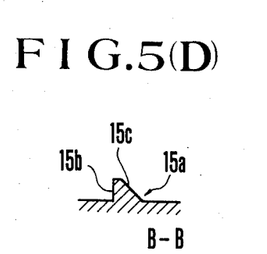

As shown in detail in FIG. 2, the above-stated gear 13 is arranged to be rotatable together with a sprocket shaft 23. A gear 14 is fitted on the sprocket shaft 23. The gear 14 and a member 15 which is provided for face clutch arrangement and is secured to the fore end of the sprocket shaft 23 jointly form a clutch mechanism for allowing or not allowing transmission of the rotation of the sprocket shaft 23 to an idler gear 16. FIGS. 5(A) and 5(B) are a plan view of the toothed part and a bottom view of the clutch mechanism consisting of the gear 14 and the member 15 representing a feature of the present invention. The gear 14 is provided with eight teeth 14a radially extending from the middle part thereof and being evenly spaced at a pitch of 45°. FIG. 5(C) is a sectional view taken on line A—A of FIG. 5(A) and shows one of the teeth 14a. As shown, each of the teeth 14a is provided with a sliding face 14c which is slanting at a predetermined angle to an engaging face 14b. The member 15 is provided with six teeth 15a which radially extend from the middle part thereof and are evenly spaced at a pitch of 60° C. Each of these teeth 15a is also provided with an engaging face 15b and a sliding face 15c in the same manner as the teeth 14a as shown in FIG. 5(D) which is a sectional view taken on line B—B of FIG. 5(B).

Figure 6:
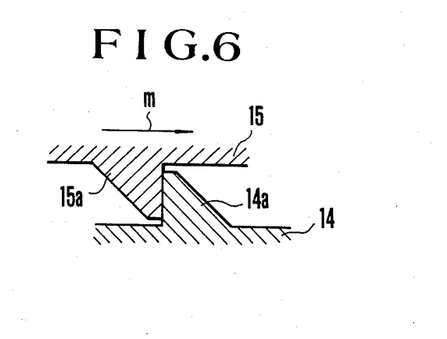
FIG. 6 is a sectional view showing an engaged state of the clutch teeth.

FIG. 6 shows the above-stated gear 14 and the member 15 as in an engaged state. When the member 15 turns in the direction of arrow m, the engaging face 15b of the member 15 pushes the engaging face 14b of the gear 14 to transmit the rotation of the member 15 to the idler gear 16 via the gear 14.

Again referring to FIG. 2, a spool gear 17 is arranged to engage the idler gear 16 and is rotatably carried by a base plate 100 via a tubular shaft 80 fitted in a hole part 17a thereof. An embracing spring 18 is wound around the outside of a smaller diameter part 17b of the spool geat 17. In other words, a known slip mechanism for film winding is formed jointly by the spool gear 17, the embracing spring 18 and a film take-up spool 2.

A sprocket 19 is provided with claws 19a which are arranged to engage the perforation of film and an escape hole 19b which is arranged to be used when a clutch screw 20 is screwed to a sprocket shaft 23. The sprocket 19 is further provided with a groove 19d which is arranged within the sprocket to engage the clutch screw 20. These parts forms a known clutch mechanism which transmits or does not transmit the rotation of the sprocket shaft 23 to the sprocket 19 according to the upward or downward movement of the sprocket shaft 23. The upper end face of the sprocket 19 is formed into a wavy cam face 19c which is arranged to abut on a pin 25. A rubber ring 22 is secured to the periphery of a roller 21. The roller 21 is provided with a cam face 21a which is shaped at the lower end of the roller in the same manner as the above-stated cam face 19c and is arranged to abut on a pin 24. The roller 21 is rotatably carried by a base plate (not shown). The roller 21 is arranged to be rotatable only when the loaded film is brought into pressed contact with the rubber ring 22 in feeding the film. The sprocket shaft 23 is constantly urged downward by a coil spring (not shown) and is arranged to be slidable upward and downward. When an external operation part 23a which protrudes to the outside of the camera is pushed upward, the sprocket shaft 23 is kept at the pushed up position with a lock lever 34 engaging a stepped part 23b of the shaft 23. At the same time, the clutch screw 20 moves upward to disengage from the groove 19d. Therefore, the clutch mechanism works to disconnect the shaft 23 from the sprocket 19. Further, since the member 15 is also moved upward, the member 15 is disconnected from the idler gear 16 to bring a switch SW1 into a closed state.

The pin 24 is slidably carried by a base plate (not shown) and is arranged to be slidable up and down. A switch SW3 is arranged to be repeatedly opened and closed accordingly as the rotation of the roller 21 causes the pin 24 to slide up and down with the latter abutting on the cam face 21a of the roller 21. Another pin 25 is carried by a base plate 101 in a vertically slidable manner and is abutting on the cam face 19c of the sprocket 19. With the pin 25 sliding up and down by the rotation of the sprocket 19, a switch SW2 repeatedly opens and closes. The winding stop lever 26 consists of a part 26a which abuts on one end 66a of a lever 66, a part 26b which engages the notch part 11b of the winding gear 11 and another part 26c which abuts on a contact piece SW4b of a switch SW4. A spring 76 is arranged to urge the lever 26 to turn clockwise. The winding stop gear 11 is thus arranged to be turned 360 degrees every time a film winding operation is performed. The part 26b of the lever 26 the notch part 11b of the gear 11 upon completion of every film winding operation, so that the film feeding extent can be restricted to a predetermined value thereby.

A mirror release signal lever 27 is arranged to abut on the cam part 11c of the winding stop gear 11 at one end 27a and on one end 65a of a lever 65 at the other end 27b thereof. At an early stage of a film winding operation, i.e. immediately after the winding stop gear 11 begins to rotate clockwise, the end 27a of the signal lever 27 rides on the cam part 11c. When the signal lever 27 rotates clockwise, the other end 27b thereof comes to abut on the end 65a of the lever 65.

A gear 28 consists of a large gear part 28a which engages the small gear part 9b of the winding gear 9 and a small gear part 28b which engages a sector gear 29. When the sector gear 29 is charged to the extent of a predetermined angle by the 360° rotation of the winding gear 9, the gear 28 disengages the winding gear 9 as the large gear part 9a of the gear 9 has several teeth omitted there. Then, the gear 28 is brought back to its initial position by the counterclockwise returning movement of a charge lever 32 which will be described later. The gear 28 is further provided with a protrudent part 28c on the surface thereof. When this protrudent part 28c pushes the sprocket shaft 23 upward, the sprocket shaft 23 is kept in that state by a lock lever 34 until the above-stated return movement of the gear 28 causes the gear to abut on the lever 34.

A shaft 30 is attached to the sector gear 29 with a charge roller 31 arranged to be freely rotatable thereon. A charge lever 32 is arranged to constantly abut on the charge roller 31 and is urged to turn counterclockwise by a spring 33. The rotation of the sector gear 29 causes the charge lever 32 to turn a predetermined degree. The lever 32 is arranged to come back to its initial position after a charge system disposed on the side of a front plate is charged by one end of the lever 32 with the lever 32 turned to the predetermined degree. The lock lever 34 is pivotally carried by a shaft 36 and is vertically slidable. A helical spring 35 urges the lock lever 34 to move upward while another spring 37 is urging the lever 34 to turn clockwise. Under a normal condition (as shown in the drawing), the lever 34 remains in a position not abutting on the protrudent part 28c of the gear 28 in the direction of height. However, when the sprocket shaft 23 is pushed up and the lock lever 34 engages the stepped part 23b of the shaft 23 to keep the shaft 23 in that state, the force of a helical spring (not shown) is arranged to urge the sprocket shaft 23 to move downward with a stronger force than the force of the helical spring 35 pushes the lock lever 34 against the force of the helical spring 35 down to a position where the lever 34 is enabled to abut on the protrudent part 28c in the direction of height.

A change-over gear blocking lever 38 has one end thereof abutting on the small diameter part 23c of the sprocket shaft 23 and the other end thereof located below a changeover gear 7. The lever 38 is provided with a bent up part 38a which is arranged at the other end to prevent the change-over gear 7 from coming down. A spring 39 is arranged to urge the lever 38 to turn clockwise. When the sprocket shaft 23 is pushed up, the change-over gear blocking lever 38 comes to abut on the large diameter part 23d of the shaft 23 via the small diameter part 23c and the tapered face 23e of the shaft. Then, the lever 38 turns counterclockwise and the bent up part 38a is retracted from the blocking position to allow thereby the change-over gear 7 to move downward.

An absorbing gear 40 is fitted on the shaft 41a of a gear 41 and is rotatable in two directions together with the gear 41. A spring 42 is arranged to urge the absorbing gear 40 which is vertically slidable to move upward. When the camera is in a film winding state (as shown in the drawing), the absorbing gear 40 is not engaging any of other gears. However, a film rewinding operation which will be described later causes the absorbing gear 40 to engage the change-over gear 7. With the gear 40 engaged with the gear 7, the rotation of the gear 40 is transmitted to the first stage gear 43 of a rewinding gear train. A change-over shaft 8 is rotatably and vertically slidably carried by a bearing 46 which is secured to a base plate and a camera body (both not shown). A spring 45 and a clamp 44 are arranged to urge the change-over shaft 8 to slide upward.

A sliding plate 47 is vertically slidably attached to a base plate (not shown) by means of screws 51 and is urged upward by the force of a spring 48. The sliding plate consists of a bent part 47a which is arranged to abut on the head part 8a of the above-stated change-over shaft 8, another bent part 47b which is arranged to abut on a contact piece SW5b of a switch SW5, a locking part 47c which is arranged to engage the fore end 49a of a lock lever 49 and a notch part 47d which is arranged to have the pin 52a of an external operation knob 52 come to fit therein at the time of change-over to film rewinding.

The lock lever 49 is urged to turn clockwise by the spring 50 and is provided with a part 49a which is arranged to lock the sliding plate 47, a part 49b which is arranged to abut on the bent part 56a of a mirror charging lever 56 and a part 49c which is arranged to engage a conical joggle 54. The conical joggle 54 is screwed to an external operation button 53 for manually stopping the film rewinding operation which will be described later. When the external operation button 53 is pushed in from outside, the tapered face of the conical joggle 54 comes to abut on the part 49c of the lock lever 49 in such a way as to turn the lock lever 49 counterclockwise and thus releases the sliding plate 47 from a locked state. A spring 55 is arranged to urge the external operation button to come back to its original position.

The mirror charging lever 56 consists of a bent part 56a which is arranged to about on one end 49b of the lock lever and an engaging part 56b which is arranged to engage the engaging part 58a of a lever 58. A charging spring 57 is arranged to urge the lever 56 to turn clockwise. A lever 61 is pivotally mounted on the shaft 62 above the mirror charging lever 56 and is urged by a spring 63 to turn clockwise. The lever 61 consists of an engaging part 61a which is arranged to engage the bent part 68a of a mirror driving lever 68 and an abutting part 61b which is arranged to abut on one end 65b of the lever 65. The mirror driving lever 68 is pivotally carried by a mirror charging shaft 60 and is urged to turn counterclockwise by a spring 64 relative to the above-stated mirror charging lever 56. The mirror driving lever 68 is provided with a part 68b which is arranged to abut on a mirror driving pin 69. When the mirror driving lever 68 turns clockwise, the mirror driving pin 69 turns on a mirror shaft 77 against the force of a spring 71 and thus moves upward. The upward movement of the pin 69 causes a mirror 72 to move upward to a predetermined position. Meanwhile, the clockwise turn of the mirror driving lever 68 causes the abutting part 68b thereof to abut on one end 66b of a lever 66. This causes the lever 66 to turn counterclockwise against the force of a spring 67. The other end 66a of the lever 66 then abuts on one end 26a of the winding stop lever 26 to cause thereby the lever 26 to turn counterclockwise. The counterclockwise turn of the lever 26 disengages the engaging part 26b from the notch part 11b of the winding stop gear 11.

The lever 58 has one end 58a arranged to engage the engaging part 56b of the mirror charging lever 56 and the other end 58b arranged to abut on a lever 73. A spring 59 is arranged to urge the lever 58 to turn to the left. An armature 74 is arranged on the above-stated lever 73 to be attracted by a magnet 75. The magnet 75 is of the PM type. With power supply effected to the magnet 75 in response to a release operation or the like, the armature 74 is released from the attracted state. A reflecting mirror 72 is arranged in a known manner to guide a light flux from an object to be photographed to a view finder optical system. The mirror 72 is retracted away from an optical path by turning it upward on a shaft 77 during a photo taking process. A mirror arm 70 to which the mirror driving pin 69 is secured is secured to the shaft 77.

The embodiment of the invention which is arranged as described above operates in the following manner: FIG. 1 shows the embodiment as in a state of having completed film winding. When a shutter release operation is performed under this condition, power supply is effected to the magnet 75. The armature 74 is released from an attracted state. The urging force of a spring (not shown) causes the lever 73 to turn in the direction of arrow. The lever 58 turns clockwise against the force of the spring 59. The engaging parts 58a and 56b disengage from each other. The charging force of the charging spring 57 causes the mirror charging lever 56 to turn clockwise. Since the lever 61 and the mirror driving lever 68 have their engaging parts 61a and 68a engaged with each other, the mirror driving lever 68 turns together with the mirror charging lever 58 in the same direction. This causes the mirror arm 70 to turn counterclockwise via the abutting part 68b of the lever 68 and the driving pin 69. The mirror 72 which is mounted on the rotating shaft of the mirror arm 70 turns upward to a predetermined position and thus moves away from the photo taking optical path. Concurrently with this, the above-stated abutting part 68b comes to abut on one end 66b of the lever 66 to cause the lever 66 to turn counterclockwise against the force of the spring 67. One end 66a of the lever 66 thus comes to abut on the abutting part 26a of the winding stop lever 26. The lever 26 turns counterclockwise to disengage its engaging part 26b from the engaging part 11b of the winding stop gear 11.

With these engaging parts disengaged, the abutting part 26c of the winding stop lever 26 pushes the contact piece SW4b of the switch SW4 to cut off the connection of the contact pieces SW4a and SW4b and to turn on the connection of the contact pieces SW4b and SW4c. After that, a shutter (not shown) comes to operate. Upon completion of a photo taking operation, the motor 1 receives power supply and begins to rotate. With the motor 1 rotating, the winding gear 9 is caused to turn in the direction of the arrow through the gear 5, the gear 6 disposed at the first stage of the reduction gear train and the change-over gear 7 disposed at the last stage of the gear train. The rotation is transmitted to the winding stop gear 11 and the gear 28. The rotation of the winding stop gear 11 drives the sprocket 19 via the gear 13 and also drives the film take-up spool 2 via the gears 14 and 16 and the spool gear 17. The film is thus taken up and fed to a predetermined extent. In this instance, the rubber ring 22 presses the film. This causes the roller 21 to rotate. The switch SW3 is repeatedly opened and closed via the cam face 21a and the pin 24. An opening and closing signal thus obtained enables the operator to confirm the film feeding state through a display made either within a view finder or on the outside of the camera.

At the initial stage of the rotation of the winding stop gear 11, the cam part 11c of the gear 11 abuts on one end 27a of the mirror release lever 27 to turn the lever 27 clockwise while the other end 27b of the lever 27 abuts on the abutting part 65a of the lever 65 to cause the lever 65 to turn clockwise. Then, the other end 65b of the lever 65 abuts on one end 61b of the lever 61 to cause the lever 61 to turn counterclockwise against the force of the spring 63. The engaging parts 61a and 68a are disengaged to allow the mirror driving lever 68 to be turned counterclockwise and returned by the charging force of the spring 84. This brings the mirror 12 back to its original position by turning it downward.

Meanwhile, the rotation of the gear 28 causes the charge lever 32 to turn clockwise a predetermined degree via the sector gear 29 against the force of the spring 33. The rotation of the charge lever 32 to the predetermined degree comes to effect mechanical charge on the side of the front plate, for quick return of the mirror, an automatic exposure (AE), automatic focusing, etc. By the mirror quick return charging action, the mirror is set at a position as shown in the drawing. When the notch part 11b of the winding stop gear 11 reaches its original position with the winding gear 9 having turned 360 degrees, the charging force of the spring 78 causes the winding stop lever 28 to turn clockwise. The part 28b of the lever 28 enters into the notch part 11b of the gear 11 to engage the latter. Then, the connection of the contact piece SW4b of the switch SW4 shifts from the contact piece SW4c to another contact piece SW4a. The rotation of the motor 1 comes to a stop. A film winding process is completed and there obtains a condition as shown in the drawing. With the above-described processes repeated, exposure of all of the film may be effected. Upon completion of the photographing operation of all the film, the camera seldom is in the state as shown in the drawing. In most cases, the film is left incompletely taken up and is in a stretched state. As a result, the whole winding charge system is left stopped halfway in an operating process. Further, in that instance, the motor 1 is alone allowed to rotate by the slip mechanism consisting of the clamp 3, the spring 4 and the gear 5. However, the stretched state of film is arranged to be detected by the fact that the contact pieces SW4b and SW4c of the switch SW4 still remain on after the lapse of one second from the commencement of power supply to the motor 1. Therefore, upon detection of this state, power supply to the motor 1 is cut off to bring the motor 1 to a stop.

The rewinding operation of the embodiment is as follows: When the external operation part 23a of the sprocket shaft 23 is pushed up, the lock lever 34 comes to engage the stepped part 23b of the shaft 23 to keep it in the pushed up state. Then, as mentioned in the foregoing, the clutches formed between the groove 19d of the sprocket 19 and the cluch screw 20 and between the gear 14 and the member 15 are respectively disconnected to set the sprocket 19 and the film take-up spool 2 at a freely rotatable state respectively. Further, the switch SW1 is closed by the upward movement of the sprocket shaft 23. At that time, if the camera is left in an incomplete film winding state after completion of photographing, the contact pieces SW4b and SW4c of the switch SW4 are on. Therefore, the switch SW1 closes according to a signal from these contact pieces SW4b and SW4c. With the switch SW1 thus closed, the motor 1 receives power supply to idly wind up the portion of film not wound up and to set the film winding charge system and the front plate charge system into the condition as shown in the drawing.

With the sprocket shaft 23 moved upward as mentioned above, the lock lever 38 turns counterclockwise against the force of the spring 38 and thus moves away from its position to block the dowanward movement of the change-over gear 7. Therefore, when the rewinding change-over operation knob 52 is pushed dowanward after the pushing up operation on the sprocket shaft 23, the sliding plate 47 slides downward against the force of the spring 48. The bent part 47a of the sliding plate 47 then pushes the change-over shaft 8 downward while another bent part 47b of the plate 47 pushes down the contact piece SW5b to cut off its connection with the contact piece SW5a. Following that, the contact piece SW5a and the contact pieces SW5c and SW5d are turned on. The locking part 49a of the lever 49 then engages the locking part 47c of the sliding plate 47 to keep the plate 47 in a lower position. Under this condition, the changeover gear 7 is disengaged from the winding gear 9 and engages the absorbing gear 40. Therefore, rotation is transmitted to a rewinding gear train which has the gear 43 at the first stage thereof.

Meanwhile, with the connection of the contact piece 5W5b shifted from the contact piece SW5a to the contact pieces SW5c and SW5d, power supply to the motor 1 begins and the motor begins to rotate. Film rewinding begins with a force transmitted to the rewinding gear train through the reduction gear train and the change-over gear 7. With the film thus rewound, the engagement between the perforation of the film and the claws 19a of the sprocket 19 causes the sprocket 19 to rotate concurrently with the film rewinding process. Therefore, the pin 25 slides up and down along the cam face 19c of the sprocket 19 to cause the switch SW2 to repeatedly open and close. Then, in the same manner as in the case of the film winding process mentioned in the foregoing, a signal representing the opening and closing operation of the switch SW2 enables the photographer or operator to confirm the travelling condition of film during the rewinding process from a display which is made either within the view finder or on the outside of the camera. The rotation of the sprocket 19 comes to a stop upon completion of film rewinding. Therefore, the opening and closing operation of the switch SW2 then comes to a stop. Then, upon receipt of a signal indicative of ceasing of the opening and closing operation (the signal is obtained, for example, when the output of an AND gate A11 for a timer TMO of FIG. 3, which will be described later, ceases from changing over a predetermined period of time), the armature 74 is released from an attracted state by effecting power supply to the magnet 75. Accordingly, the charging lever 58 then turns clockwise as mentioned in the foregoing. Then, the abutting parts 56a and 49b come to abut on each other. The lever 49 turns to the left against the force of the spring 50. The locking parts 49a and 47c disengage from each other. The charging force of the spring 48 causes the sliding plate 47 to slide upward back to its original positon. With the sliding plate thus returned, the urging force of the spring 45 causes the change-over gear 7 to move upward to disengage the absorbing gear 40 and to come back to a state of engaging the winding gear 9 as shown in the drawing.

Meanwhile, since the turn of the charging lever 56 to the right causes the lever 66 to turn to the left as mentioned in the foregoing, the winding stop lever 26 turns to the left to disengage the engaging part 26b from the notch part 11b of the winding stop gear 11. Then, the contact pieces SW4b and SW4c turn on. Further, the return of the sliding plate 47 cuts off the connection of the contact piece SW5b with the contact pieces SW5c and SW5d. Therefore, the circuit of the camera determines that the winding operation has not been completed and thus once performs blank winding as mentioned in the foregoing. With the blank winding thus performed, the return movement of the gear 28 which takes place in response to the return movement of the charge lever 32 causes the protrudent part 28c of the gear 28 to abut on the lock lever 34. This releases the sprocket shaft 23 from a locked state and allows the shaft 23 to be brought back to its original position by the urging force of the helical spring. Thus the condition which is shown in the drawing is completely restored.

The arrangement to automatically stop the rewinding operation and to automatically return the external operation member of the sprocket shaft 23 and the rewinding change-over knob 52 upon completion of film rewinding is as described above. However, in cases where it is desired to have the film not completely taken up into a cartridge or where it is desired to stop film rewinding at an arbitrary point, the button 53 is pushed in. Then, the part 49c of the lever 49 is pushed by the tapered face 54a of the conical joggle 54 and the lever is caused thereby to turn to the left. Therefore, the locking parts 49a and 47c are disengaged from each other to permit the sliding plate 47 to slide upward back to its original position. This brings the film rewinding operation to a stop.

With the face clutch arranged according to the invention, the loss of a peripheral speed ratio arises as follows: As mentioned in the foregoing, the gear 14 has eight teeth and the member 15 six teeth. The pitch (P) of the former is 45° and that of the latter 60°. After in carrying out a next film winding operation after the sprocket shaft 23 has returned to its original position with film rewinding completed, the clutch does not engage within a turning angle the maximum value of which is 15° (loss angle). The gear 14 is not driven and the take-up spool does not rotate during that period. This causes a decrease in the peripheral speed ratio. In accordance with the arrangement of the prior art wherein both the number of upper teeth and that of lower teeth are six, there takes place blank rotation for a maximum angle of 60° (loss angle).

Assuming that a sprocket is arranged to make one turn in feeding one frame portion of film and that the peripheral speed ratio is set at 1.2, the decreases in peripheral speed ratio resulting from the loss angles of 15° and 60° can be compared as shown below:

(i) In the case of 15° loss:

$$1.2 \times \frac{360° - 15°}{360°} = 1.15$$

(ii) In the case of 60° loss:

$$1.2 \times \frac{360° - 60°}{360°} = 1$$

It is apparent from the above comparison that the greater the loss angle is, the more the peripheral speed ratio decreases.

While the number of teeth on the side of the member 15 is set at six in this particular embodiment, the number of teeth may be changed to three. With the number of teeth of the member 15 changed to three, the loss angle still becomes 15° and gives the same result. The reason for setting the number of teeth at six in this embodiment resides in that the driving force from the member 15 can be transmitted to the gear 14 with better balance relative to the center of rotation.

Figures 3, 4A, 4B, 4C:
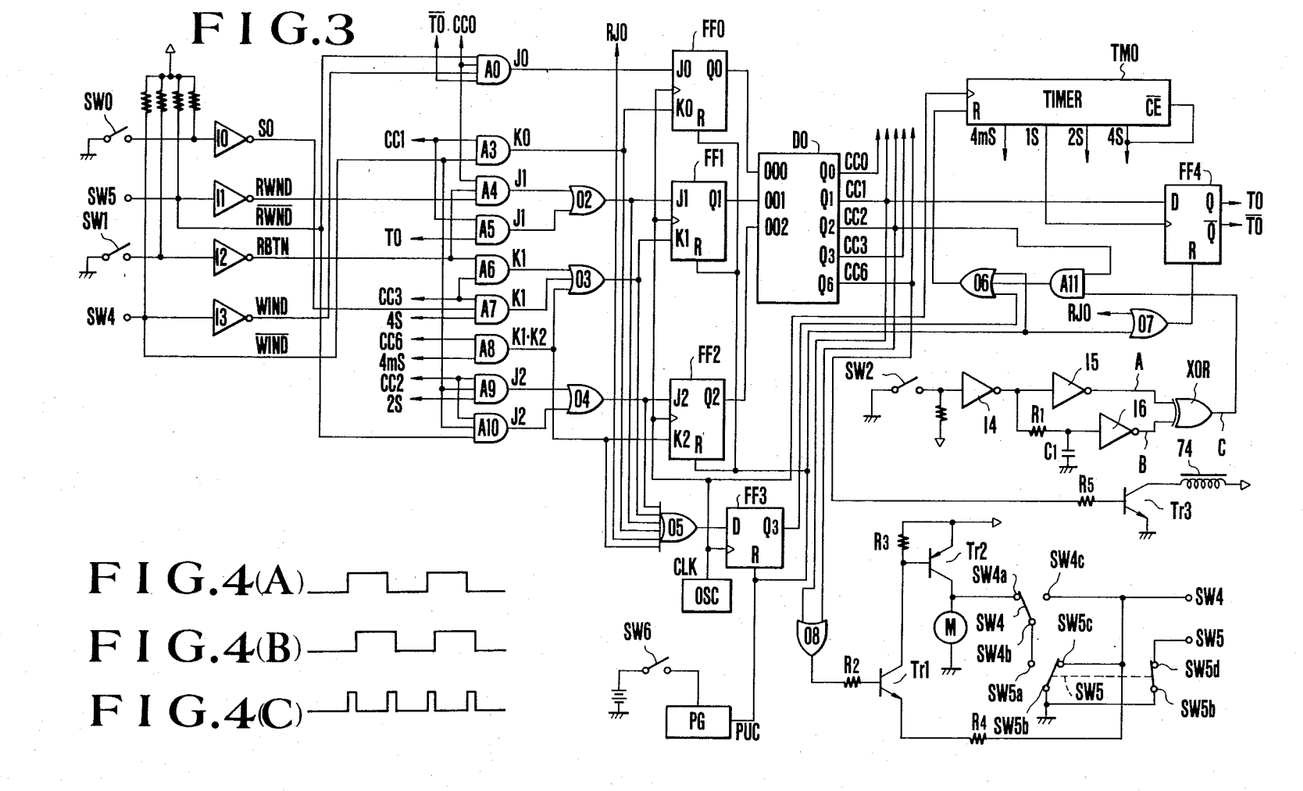
FIG. 3 is a circuit diagram showing a control circuit arranged to control the motordriven winding and rewinding operations of the camera.
FIGS. 4(A)–4(C) are wave form charts.

Next, an example of a control circuit for carrying out the above-stated film winding and rewinding will be described with reference to FIG. 3. Referring to FIG. 3, the control circuit includes AND gates A0-A10; OR gates O2-O8; inverters I0-I6; flip-flops FF0-FF4; an XOR gate XOR; a decoder D0, a timer TMO, an oscillator OSC; switches SW0, SW1, SW2 and SW6; and change-over switches SW4 and SW5.

When a power supply switch SW6 is turned on, a reset pulse signal generating circuit PG generates a reset pulse signal PUC. The signal PUC resets the timer TMO via the flip-flops FF0-FF3 and the OR gate O6 and also resets the flip-flop FF4 via the OR gate O7. Therefore, the outputs of the output terminals Q1-Q3 of the flip-flops FF0-FF3 become zero. The output of the output terminal Q0 of the decoder D0 becomes 1 and the sequence of the circuit becomes CC0. At this time, if the camera is in a state of having completed film winding, the switch SW4 is connected to the contact piece SW4a. If the camera is in a rewinding state, the contact pieces SW5c and SW5d of the switch SW5 is on and the switch SW1 is also on. In that case, therefore, the input terminals of the inverters I1 and I2 are grounded and their outputs becomes 1 to produce signals RWND and RBTN. Then, the output J1 of the AND gate A4 becomes 1. Then, the input J1 of the flip-flop FF1 becomes 1 through the OR gate O2. Meanwhile, other inputs of the flip-flops FF0 and FF2 are 0. Therefore, in synchronism with the rise of a clock pulse CLK produced from the oscillator OSC, the output Q1 of the flip-flop FF1 becomes 1 while the outputs of other flip-flops remain unchanged. Therefore, the input of the decoder D0 becomes 001 and the output Q2 of the decoder becomes 1. In other words, the sequence becomes CC02. Further, since the output 1 of the OR gate O2 causes the input D of the flip-flop FF3 to become 1 via the OR gate O5, the output Q3 of the flip-flop FF3 becomes 1 to reset the timer TMO via the OR gate O6. When the sequence changes from CC0 to CC2, the output of the AND gate A4 becomes 0. The outputs of the OR gates O2 and O5 become 0 and the input D of the flip-flop FF3 becomes 0. Then, the output Q3 of the flip-flop FF3 becomes 0 when a next clock pulse CLK rises. In this manner, the flip-flop FF3 resets the timer TMO via the OR gate O6 by producing one clock portion of the reset pulses every time the sequence changes.

The output of the sequence CC2 enables the AND gates A9, A10 and A11 and also turns on transistors Tr1 and Tr2 via the OR gate O8 and a resistor R2. As a result, a motor M is turned on. When the camera begins to rewind the film, the timer TMO begins to count time. Further, in response to film rewinding, the sprocket 19 rotates. This causes the switch SW2 to turn on and off via the cam face 19c and the pin 25. A pulse generating circuit which is composed of inverters I4-I6, an XOR gate and elements C1 and R1 generates a pulse every time the switch SW2 changes its position from "on" to "off" or from "off" to "on" as shown in FIG. 4(C). The pulse thus produced resets the timer TMO via the AND gate A11 and the OR gate O6. Then, the output 2S of the timer TMO becomes 0. If the position of the switch SW2 shifts within 2 seconds, a film rewinding operation continues. When the film detaches from the claws 19a of the sprocket 19 with the film rewinding operation approaching to the end thereof, the switch SW2 either remains "on" or "off". Therefore, the output of the XOR gate remains at 0. The output 2S of the timer TMO becomes 1 two seconds after ceasing of the on-and-off operation of the switch SW2. This causes the output of the AND gate A9 to become 1. As a result, the output of the OR gate O4 becomes 1 to cause the input J2 of the flip-flop FF2 to become 1. The output of the flip-flop FF2 then becomes 1 at rise of the clock pulse CLK. In this instance, since the inputs J0, K0, K1 and J1 of other flip-flops FF0 and FF1 are at 0, their outputs remain unchanged. In other words, the output Q0 of the flip-flop FF0 is at 0 and the outputs Q1 and Q2 of flip-flops FF1 and FF2 at 1. Therefore, the output Q6 of the decoder D0 becomes 1 and the sequence is advanced to CC6. This causes the output of the OR gate O8 to become 0. The transistors Tr1 and Tr2 turn off. The motor is turned off to bring film rewinding to an end.

Further, with the sequence advanced to CC6, a transistor Tr3 turns on to effect power supply to a magnet 74. Therefore, a mirror uplifting mechanism is actuated. The contact pieces SW5a and SW5b of the switch SW5 are turned on while the contact pieces SW5c and SW5d are turned off. With the mirror uplifted, the contact piece SW4a of the switch SW4 is turned off and the contact piece SW4c turned on. After the lapse of 4 milli-seconds from the start of the sequence CC6, the output 4 ms of the timer TMO becomes 1. The output of the AND gate A8 becomes 1 to cause thereby the output of the OR gate O3 to become 1. Accordingly, the inputs K1 and K2 of the flip-flops FF1 and FF2 become 1 while other inputs are at 0. Therefore, at the rise of a clock pulse CLK, the output of each of the flip-flops FF0–FF2 becomes 0. The output Q0 of the decoder D0 becomes 1 and the sequence becomes CC0. At that time, since the switch SW4 is on, the output of the inverter I3 becomes 1. Further, since the switch SW5 is off, a signal $\overline{RWND}$ is at 1. Since the flip-flop FF4 is in a reset state, an output $\overline{T0}$ produced from its output terminal $\overline{Q}$ is 1. Therefore, the output of the AND gate A0 becomes 1 and is supplied to the input terminal J0 of the flip-flop FF0. At that time, the rise of a clock pulse CLK causes the output of the flip-flop FF0 to become 1 and those of the flip-flops FF1 and FF2 to become 0. Therefore, the input of the decoder D0 becomes 001 and the output Q1 thereof becomes 1. The operation advances to the sequence CC1. Then, the transistor Tr3 turns off and the magnet 74 also turns off. The output of the OR gate O8 becomes 1. Then, since contact pieces SW4b and SW4c of the switch SW4 are on and the contact pieces SW5a and SW5b of the switch SW5 are also on, the transistors Tr1 and Tr2 turn on to actuate the motor M. The camera then begins to perform a blank film winding operation.

After commencement of film winding, if the film winding is completed within one sec., for example, the contact pieces SW4b and SW4c of the switch SW4 turn off and the contact pieces SW4a and SW4b turn on. As a result, the transistors Tr1 and Tr2 turn off to bring the rotation of the motor M to a stop. Since the contact piece SW4a which has turned on is connected to the ground GND via contact pieces SW4b, SW5a and SW5b, the two terminals of the motor M are short-circuited to have the brake applied to the motor. Further, the latch mechanism of the sprocket shaft 23 is released upon completion of film winding. The switch SW1 then turns off to bring the camera into its initial state. Since the contact pieces SW4b and SW4c are off, a signal $\overline{WIND}$ becomes 1. The output of the AND gate A3 becomes 1. This causes the input K0 of the flip-flop FF0 to become 1. Therefore, the output Q0 of the flip-flop FF0 becomes 0 at rise of the clock pulse CLK. The outputs Q1 and Q2 of the flip-flops FF1 and FF2 are at 0. Therefore, the input of the decoder D0 becomes 000. The output Q0 of the decoder becomes 1 and the sequence comes back to CC0.

In case that film winding is not completed within one second during the film winding operation, i.e. in the sequence CC1, the operation of the embodiment is as follows: The sequence CC1 causes the motor to turn on in the same manner as in the case described above. The camera begins to wind up the film. Concurrently with that, the timer begins to count. After the lapse of one second, the output 1S of the timer becomes 1. Since this output is supplied to the clock terminal c of the flip-flop FF4, the output T0 of the output terminal Q of the flip-flop FF4 becomes 1. Therefore, the outputs of the AND gate A5 and the OR gate O2 become 1. The output of the OR gate O2 is supplied to the terminal J1 of the flip-flop FF1. Therefore, the output Q1 of the flip-flop FF1 becomes 1 at rise of the clock pulse CLK. Further, since the output Q0 of the flip-flop FF0 and the output Q2 of the flip-flop FF2 are at 0, the output Q3 of the decoder D0 becomes 1 and the operation advances to the sequence CC3, which represents a state of not having completed film winding as yet.

Under the condition of the sequence CC3, when the sprocket shaft 23 is operated to release the latch mechanism and to cause the switch SW1 to turn on, the output signal RBTN of the inverter I2 becomes 1. Therefore, the outputs of the AND gate A6 and the OR gate O3 become 1. The input K1 of the flip-flop FF1 thus becomes 1. Therefore, the output Q1 of the flip-flop FF1 becomes 0 at rise of the clock pulse CLK. The input of the decoder D0 then becomes 001. The output Q1 of the decoder D0 becomes 1 and the sequence becomes CC1 to perform the above-stated film winding operation. Further, after the lapse of 4 seconds from the beginning of the sequence CC3, the output 4S of the timer TMO becomes 1 to cause the output of a terminal CE thereof to become 1. This brings the counting operation to a stop and the output 4S of the timer remains at 1. If a light measurement switch SW0 (not shown) is turned on under this condition, the output of the inverter I0 becomes S0. This causes the output of the AND gate A7 to become 1 and that of the OR gate O3 also to become 1. Then, the sequence becomes CC1 and the camera performs a film winding operation.

With a quiescent time of, for example, 4 seconds provided as described above, the heat of the motor is lowered, so that the service life thereof can be lengthened. Besides, it gives a rest to the battery in use, so that the life of the battery also can be lengthened. Further, the battery voltage recuperates during the quiescent time, so that the film can be adequetely wound up with the winding operation performed again. This is advantageous particularly under low ambient temperature.

In the embodiment described, the number of teeth of the face clutch is arranged to be six on the driving side and eight on the side to be driven. However, in accordance with the invention, the number of teeth is not limited to such values. Table 1 shows combinations of numbers of teeth not exceeding ten and satisfying a condition of $Z1/Z2 \neq n$, wherein Z1 represents the number of teeth on the driving side and Z2 that of the side to be driven ($Z2 < Z1$). In Table 1 below, P1 and P2 respectively denote the pitches on the driving side and the side to be driven. Further, the loss angle can be obtained at the minimum value satisfying the following condition: $P1n1 - P2n2 > 0$ ($n1, n2 = 1, 2, 3, ---$).

TABLE 1

| Number of teeth on driving side (Z1) | Number of teeth on side to be driven (Z2) | Pitch of side to be driven (P1) | Pitch of driving side (P2) | Loss angle |
| --- | --- | --- | --- | --- |
| 3 | 2 | 120° | 180° | 60° |
| 5 | 2 | 72° | 180° | 36° |
| 9 | 2 | 40° | 180° | 20° |
| 4 | 3 | 90° | 120° | 30° |
| 5 | 3 | 72° | 120° | 24° |
| 8 | 3 | 45° | 120° | 15° |

TABLE 1-continued

| Number of teeth on driving side (Z1) | Number of teeth on side to be driven (Z2) | Pitch of side to be driven (P1) | Pitch of driving side (P2) | Loss angle |
|---|---|---|---|---|
| 5 | 4 | 72° | 90° | 18° |
| 6 | 4 | 60° | 90° | 30° |
| 9 | 4 | 40° | 90° | 10° |
| 6 | 5 | 60° | 72° | 12° |
| 8 | 5 | 45° | 72° | 18° |
| 9 | 5 | 40° | 72° | 8° |
| 8 | 6 | 45° | 60° | 15° |
| 9 | 6 | 40° | 60° | 20° |
| 9 | 8 | 40° | 45° | 5° |

As apparent from Table 1 above, the invented arrangement to have Z1 and Z2 in the above-stated specific relation to each other reduces the loss angle to a great degree as compared with the prior art arrangement wherein Z1 and Z2 are equal to each other. With the Z1 and Z2 arranged to be equal to each other, it is inevitable to have the loss angle become equal to the pitch. Whereas, in accordance with this invention, the loss angle obtained is very small and is only 1/9-⅓ of the value of the pitch. In order to obtain a loss angle of 5° with Z1 and Z2 arranged to be equal to each other, the number of teeth becomes Z1=Z2=72, which is hardly obtainable by machining. Whereas, the values Z1=9 and Z2=8 to be employed according to the invention is readily practicable. The face clutch according to the invention is thus readily obtainable with sufficient tooth strength and is capable of lowering the loss of peripheral speed ratio.

Further, a suitable combination of the numbers of teeth can be selected from the values shown in Table 1 in consideration of the space to be provided at teeth, the strength required for the teeth, the practicable machining technique, the allowable loss of peripheral speed ratio, etc. Further, it is preferable for better balance to have the driving transmission force obtained, under an engaged condition, in the form of a force couple. Therefore, the teeth are preferably arranged in symmetrical directions. Further, it goes without saying that the same result can be obtained by interchanging the number of teeth on the driving side shown in Table 1 with the number of teeth on the side to be driven.

In the embodiment described, to minimize the loss angle for effecting the transmission in the best manner with a small number of teeth, the number of upper teeth Z1 and the number of lower teeth Z2 are arranged to be in a relation of $Z1/Z2 \neq n$ (wherein n: an integer). However, the relation may be replaced with another relation $Z1/Z2 = n$ (wherein n: an integer other than 1). In that event, the loss angle can be reduced to the same degree with the value of "n" arranged to be a small integer such as 2, 3 or 4 or thereabout.

In the case of the specific embodiment described, the pitch of the upper teeth and that of the lower teeth are differentiated from each other by arranging the upper and lower teeth in different numbers Z1 and Z2. In case that the upper and lower teeth are to be arranged in the same number, however, the loss angle can be also reduced by arranging either one of the upper or lower toothed parts at varied pitches. In that event, if the toothed part consists of six teeth, for example, the varied pitches may be arranged to be 60°, 45°, 75°, 60°, 45° and 75°.

In accordance with this invention, as described in the foregoing, the upper and lower teeth forming a face clutch are arranged at different pitches. The loss of rotation which arises at the time of change-over from a disconnected state to a connected state can be lessened by this arrangement.

Further, in accordance with the invention, the face clutch is formed at the transmission member of a film take-up spool. The invented arrangement to have the face clutch formed by the upper and lower teeth arranged at different pitches satisfies both of the contradictory requirements, one calling for reduction in loss of peripheral speed ratio and the other calling for sufficient toothed face strength and good workability of the clutch in the manufacture thereof.

In accordance with the invention, the number of upper teeth Z1 and that of lower teeth forming the above-stated face clutch are designed to be in a relation of $Z1/Z2 \neq n$, wherein n represents an integer. This relation enables the face clutch to reduce the rotation loss or the loss in the peripheral speed ratio with an extremely simple structure and enhanced strength of the tooth face.

It is another advantage of the invention that, with engaging and sliding faces provided on the upper and lower teeth forming the face clutch for ratchet engagement, the clutch mechanism ensures reliable engagement.

While a specific embodiment of the invention has been shown and described in detail to illustrate the application of the inventive principles, it will be understood that the invention may be embodied otherwise without departing from such principles.

What I claim is:

1. A clutch mechanism for a camera, comprising:
    (a) a sprocket arranged to feed one frame portion of film at a time by rotating a predetermined angle in response to one film winding operation;
    (b) a take-up spool arranged to take up the film;
    (c) a drive transmission system arranged to drive said take-up spool; and
    (d) a face clutch arranged within said drive transmission system to allow or cut off the transmission of a driving force, said face clutch having driving teeth arranged at a pitch different from the pitch of teeth to be driven.

2. A clutch mechanism for a camera according to claim 1, further comprising a slip mechanism of a frictional structure arranged to absorb a difference between the moving extent of an arbitrary point on the periphery of said sprocket in the rotating direction thereof and the moving extent of an arbitrary point on the periphery of said take-up spool in the rotating direction thereof.

3. A clutch mechanism for a camera according to claim 1, wherein said face clutch comprises upper and lower teeth arranged in a ratchet engagement structure to engage only in one rotating direction.

4. A clutch mechanism for a camera according to claim 2, wherein said face clutch comprises upper and lower teeth arranged in a ratchet engagement structure to engage only in one rotating direction.

5. A clutch mechanism for a camera according to claim 1, wherein said face clutch comprises upper and lower teeth arranged in different numbers.

6. A clutch mechanism for a camera according to claim 2, wherein said face clutch comprises upper and lower teeth arranged in different numbers.

7. A clutch mechanism for a camera, comprising:
(a) a sprocket arranged to feed one frame portion of film at a time by rotating a predetermined angle in response to one film winding operation;
(b) a take-up spool arranged to take up the film;
(c) a drive transmission system arranged to drive said take-up spool; and
(d) a face clutch arranged within said drive transmission system to allow or cut off the transmission of a driving force, said face clutch being formed by a driving toothed part and a toothed part to be driven, either one of the toothed parts having a larger number of teeth ($Z1$) than the number of teeth ($Z2$) of the other, these numbers of teeth being set to satisfy a relation of $Z1/Z2 \neq n$, wherein $Z1 > Z2$ and n represents an integer.

8. A clutch mechanism for a camera according to claim 7, further comprising a slip mechanism of a frictional structure arranged to absorb a difference between the moving extent of an arbitrary point on the periphery of said sprocket in the rotating direction thereof and the moving extent of an arbitrary point on the periphery of said take-up spool in the rotating direction thereof.

* * * * *